US008028638B2

(12) United States Patent
Olsen et al.

(10) Patent No.: US 8,028,638 B2
(45) Date of Patent: Oct. 4, 2011

(54) METHOD OF DYNAMIC POSITIONING OF A VESSEL

(75) Inventors: Claes W. Olsen, His (NO); Bjorn E. Gustavsen, Bjorbekk (NO)

(73) Assignees: Remora Technology AS; Torp Technology AS ( * ) Notice: Subject to any disclaimer, the term of this patent is extended or adjusted under 35 U.S.C. 154(b) by 0 days.

(21) Appl. No.: 11/569,987

(22) PCT Filed: May 31, 2005

(86) PCT No.: PCT/NO2005/000177
§ 371 (c)(1),
(2), (4) Date: Jul. 2, 2007

(87) PCT Pub. No.: WO2005/118389
PCT Pub. Date: Dec. 15, 2005

(65) Prior Publication Data
US 2008/0070456 A1    Mar. 20, 2008

(30) Foreign Application Priority Data

Jun. 3, 2004    (NO) .................................. 20042362

(51) Int. Cl.
B63B 21/56    (2006.01)
B63B 22/02    (2006.01)
B63B 22/18    (2006.01)
B63B 35/40    (2006.01)
B63H 25/00    (2006.01)

(52) U.S. Cl. ............. 114/258; 114/242; 114/246; 441/3
(58) Field of Classification Search ............. 114/144 R, 114/144 B, 230.1, 242, 248, 258–260, 121, 114/123, 244–250, 125; 441/3–5
See application file for complete search history.

(56) References Cited

U.S. PATENT DOCUMENTS

| 1,632,491 | A | * | 6/1927 | Matthiessen et al. ........... 114/46 |
| 2,287,434 | A | * | 6/1942 | Knudsen ........................ 114/45 |
| 3,841,501 | A | * | 10/1974 | Heijst ........................ 414/138.1 |
| 6,485,343 | B1 | | 11/2002 | Borseth |
| 6,834,604 | B2 | * | 12/2004 | O'Neil et al. .................... 114/44 |
| 2004/0168744 | A1 | | 9/2004 | Olsen |

FOREIGN PATENT DOCUMENTS

| DE | 3737806 A1 | * | 6/1988 |
| GB | 2086821 A | * | 5/1982 |
| JP | 54100083 A | * | 8/1979 |
| JP | 60018483 A | * | 1/1985 |
| JP | 10244993 A | * | 9/1998 |
| WO | WO02072415 | | 9/2002 |
| WO | WO 02072415 A1 | * | 9/2002 |
| WO | WO 03078243 A1 | * | 9/2003 |
| WO | WO 2004074085 A1 | * | 9/2004 |

* cited by examiner

*Primary Examiner* — Ajay Vasudeva
(74) *Attorney, Agent, or Firm* — Fox Rothschild LLP; Richard C. Woodbridge; Perry M. Fonseca

(57) ABSTRACT

A method of dynamic positioning of a vessel (16, 32), wherein a positioning system controls at least one positioning machinery (18), and where two or more buoys (1), each comprising at least one positioning machinery (18), are coupled to the vessel (16, 32).

5 Claims, 4 Drawing Sheets

METHOD OF DYNAMIC POSITIONING OF A VESSEL

CROSS REFERENCE TO RELATED APPLICATIONS

The present application is related to, and claims priority from, PCT/NO2005/000177 filed May 31, 2005, and Norway Patent Application No. 20042362 filed on Jun. 3, 2004, the entire contents of which are hereby incorporated by reference in their entirety.

BACKGROUND OF THE INVENTION

1. Field of the Invention

This invention regards a method of dynamic positioning of a vessel. More particularly, it regards a method that involves two or more floating buoys being coupled to a vessel by means of buoyancy, wherein the buoys are provided with positioning machinery. The buoys form part of a dynamic positioning system and are preferably provided with energy from a generator placed on the vessel.

2. Description of Related Art

When operating in relatively shallow waters offshore it is customary to use anchor based mooring methods. Anchor systems of this type reveal substantial flaws when it comes to anchoring a vessel at greater depths. The main reason for this is that the length of chain or steel cable required causes a weight-induced strain on the mooring that takes up a considerable share of the tensile strength of the mooring.

Thus it has become more and more common to equip vessels operating in deep waters with so-called dynamic positioning. Vessels such as drilling vessels, supply vessels, accommodation vessels or cargo vessels are to an increasing extent being equipped with this kind of equipment.

In addition to navigation and control systems, a dynamic positioning system also includes positioning machinery. It is essential that the vessel be equipped with positioning machinery that is arranged to exert a pushing force in at least two directions and in two positions on the vessel. Positioning machinery of this type typically includes several positioning thrusters that are generally arranged for rotation in the horizontal plane, so as to allow them to exert a pushing force in any horizontal direction.

For vessels originally built to use conventional anchor system, the conversion required to allow them to use dynamic positioning has proven to be a relatively complex and costly process.

SUMMARY OF THE INVENTION

The object of the invention is to remedy the disadvantages of prior art.

The object is achieved in accordance with the invention, by the characteristics stated in the description below and in the following claims.

A buoy is equipped with positioning machinery and is arranged to form part of a dynamic positioning system. The buoy is constructed so as to be relatively easy to connect a vessel without requiring any significant adaptation or conversion of the vessel.

Cost factors demand that buoys of this type be designed with relatively small dimensions. As a result it is normally necessary to fit a vessel with two buoys to maintain an accurate position and directional orientation. If so required, for reasons of security or other reasons, the vessel may be equipped with two additional buoys.

In a preferred embodiment the buoy comprises a submersible coupling portion arranged to stick to the bottom of a vessel by means of buoyancy forces. Advantageously the coupling portion is provided with friction material. If so desired, the contact pressure between the coupling portion and the vessel can be increased further by draining off the water between said devices in order to reduce the pressure in this area.

Preferably the propulsion machinery is supplied with energy from the vessel or an energy supply placed on the deck of the vessel.

For installation the buoy is lowered partway into the sea until the coupling portion is at a deeper level than the bottom of the vessel. Then the buoy is displaced towards the vessel so as to bring the coupling portion in under the vessel, whereupon ballast is pumped out of the buoy.

By doing so, the buoy lifts in the sea until the coupling portion contacts the bottom of the vessel, pushing and sticking against the bottom.

The buoy may be installed on the vessel prior to the vessel sailing to the site where the dynamic positioning is to be used, or it may be coupled to the vessel on site, the buoy being self-propelled when supplied with propulsive power.

If the vessel in question is no longer to be used in deep waters and therefore no longer requires the use of dynamic positioning equipment, the buoy may easily be transferred to another vessel.

The method according to the invention, which allows the use of dynamic positioning on a vessel not equipped with the necessary propulsion machinery, makes it possible to use a vessel not originally intended for such positioning, also in deeper waters.

BRIEF DESCRIPTION OF THE DRAWINGS

The following describes a non-limiting example of a preferred method illustrated in the accompanying drawings, in which.

DETAILED DESCRIPTION OF THE INVENTION

Figure 1:
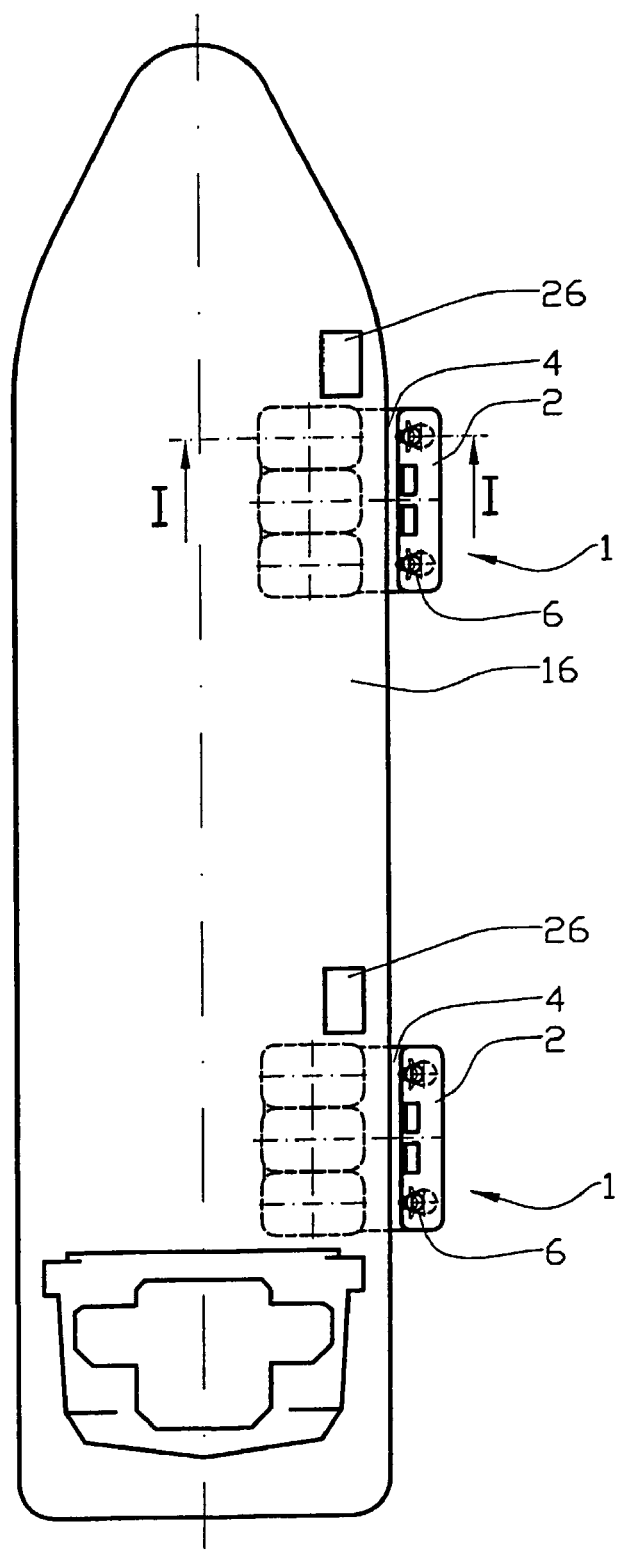
FIG. 1 shows a vessel equipped with two buoys according to the invention.
Figure 2:
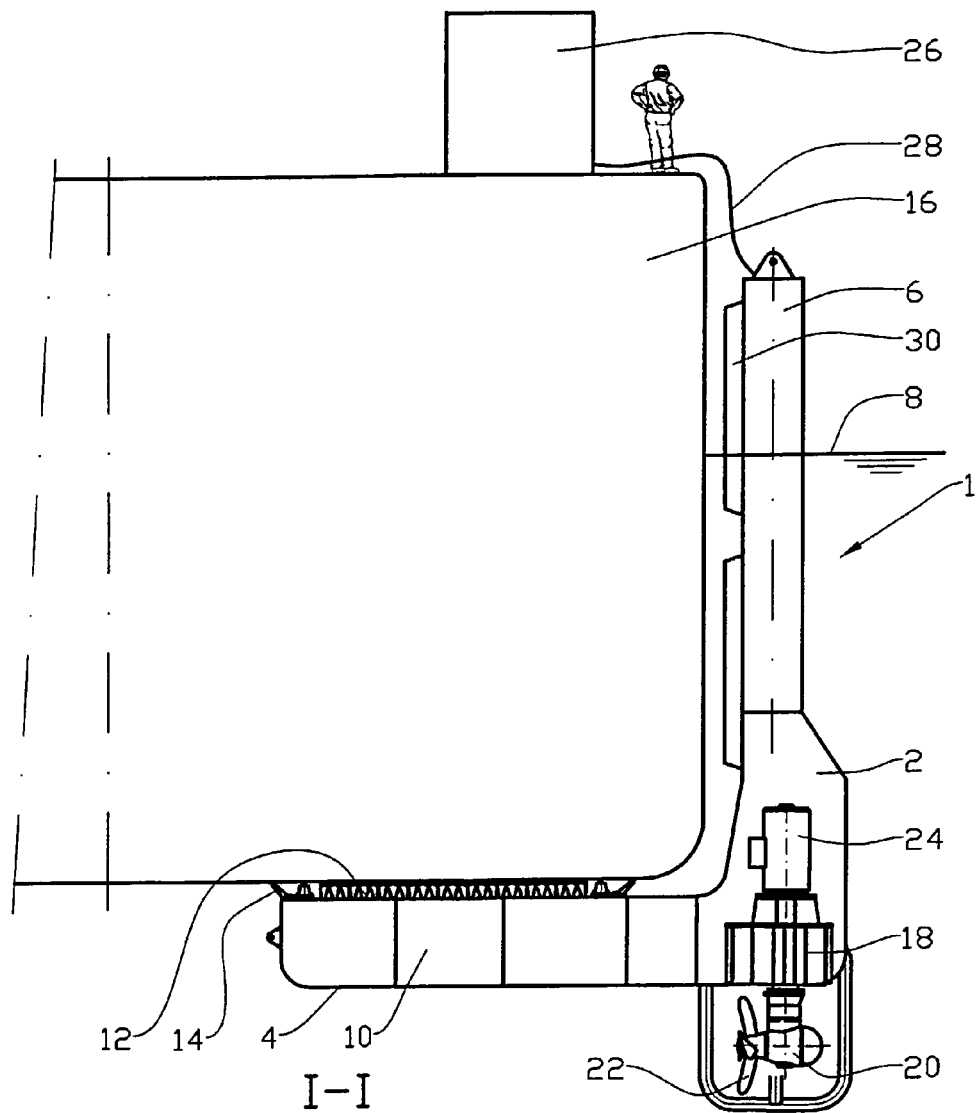
FIG. 2 is a section taken along I-I in FIG. 1, on a larger scale.
Figure 3:
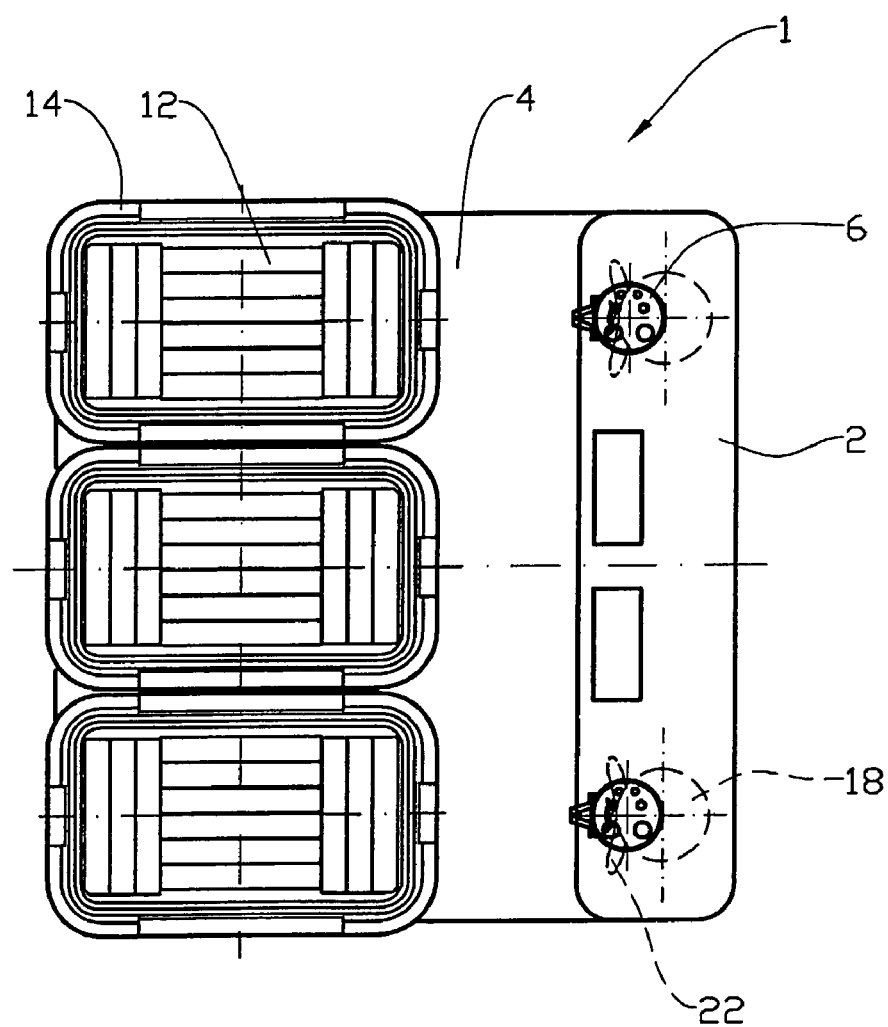
FIG. 3 is a plan view of a buoy.

In the drawings, reference number 1 denotes a buoy comprising machinery housing 2, a flat coupling portion 4 projecting sideways from the machinery housing 2 and two vertical columns 6 projecting upwards from the machinery housing 2.

The machinery housing 2 and the coupling portion 4 are submerged when the buoy 1 is in the operative position, while the columns 6 protrude, at least partly, above the sea level 8.

The upward facing side of the coupling portion 4, which is equipped with ballast tanks 10, is fitted with a flexible friction material 12. Surrounding the friction material 12 is a seal 14 arranged to sealingly abut the bottom of a vessel 16 when the buoy 1 is coupled to the vessel 16.

In the machinery housing 2 there is arranged positioning machinery in the form of two positioning thrusters 18 that may be rotated about their own vertical axes. Each thruster comprises a submerged angular gear 20 with a propeller 22 driven by an electric motor 24. A generator 26 placed on the deck of the vessel 16 delivers energy to the motor 24 via a cable 28.

The machinery housing 2 holds ballast pumps (not shown) and also the necessary piping and valves (not shown).

The columns 6 have fenders 30 facing the coupling portion 4. The upper portion of the columns 6 is always located above the surface 8 of the sea, and therefore the columns 6 constitute a connection from the surface down to the machinery housing 2, for access and conveyance of the cable 28 plus control cables and pipe connections (not shown).

The positioning machinery 18 of the buoy 1 is controlled in a manner that is known per se, by a control system for dynamic positioning (not shown).

In order to couple the buoy 1 to the vessel 16, the buoy 1 is lowered into the sea by regulating the ballast, among other things in the ballast tanks 10, until the coupling portion 4 is somewhat deeper in the sea than the bottom of the vessel 16.

The buoy 1 is then moved in towards the vessel 16, preferably until the fenders 30 stops against the vessel 16. Pumping out ballast raises the buoy 1 until the friction material 12 stops against the bottom of the vessel 16. Pumping out additional ballast from the buoy 1 increases the contact pressure between the friction material 12 and the bottom of the vessel.

The seal 14 that sealingly abuts the bottom of the vessel 16 prevents inflow of water to the friction material 12 when water is drained from the space between the coupling portion and the bottom of the vessel 16.

Figure 4:
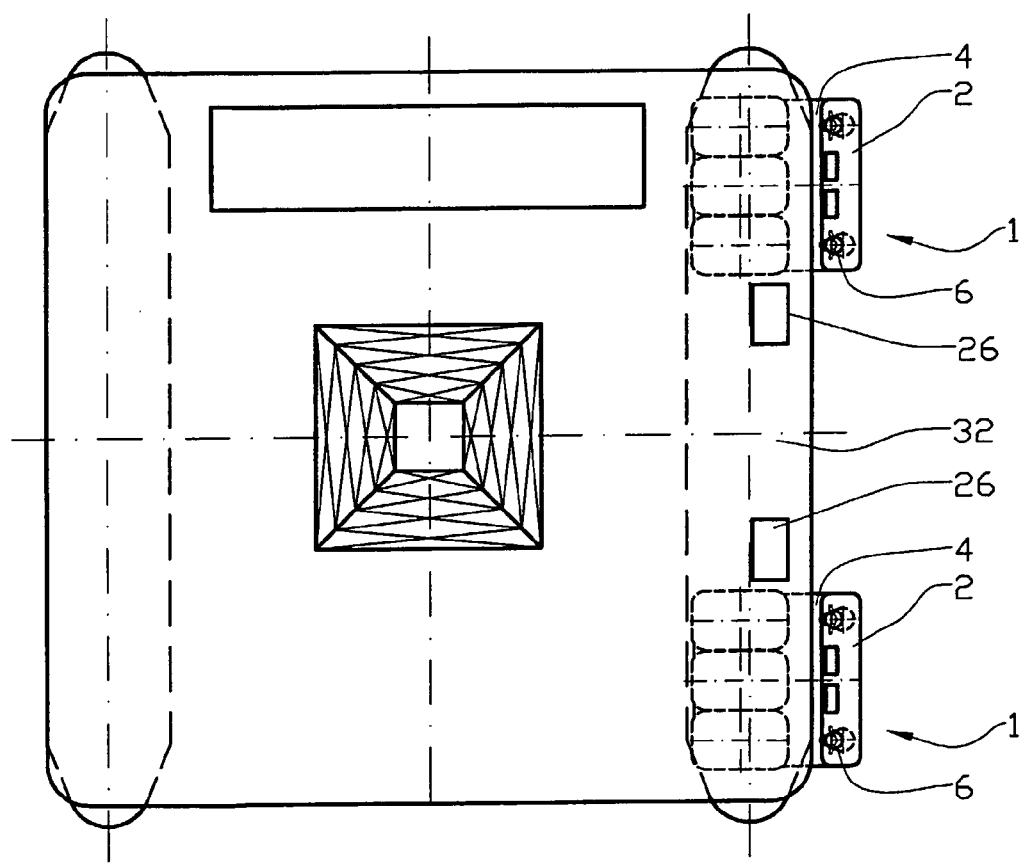
FIG. 4 shows two buoys connected to a semi submersible platform.

FIG. 4 shows two buoys coupled to a semi submersible platform 32.

The invention claimed is:

1. A method of dynamic positioning of a vessel, wherein a positioning system controls at least one positioning machinery to exert a pushing force in any horizontal direction, characterized in that two or more buoys, each comprising a substantially flat coupling portion and said at least one positioning machinery with a thruster rotatable about a vertical axis, are coupled to the vessel by increasing frictional engagement between an upper surface of the coupling portion and a bottom of the vessel, and thereby arranged to keep the vessel in a directional orientation while a substantial portion of the bottom of the vessel remains continuously in contact with the sea and below sea-level, wherein each buoy comprises at least one vertical column extending above said substantially flat coupling portion, and wherein each said at least one vertical column is disposed on only one side of the buoy with respect to a central axis of the buoy.

2. A method in accordance with claim 1, characterized in that the frictional engagement is increased by means of buoyancy.

3. A method in accordance with claim 2, characterized in that a friction material is placed between the buoy and the vessel.

4. A method in accordance with claim 3, characterized in that water present in the friction material is drained.

5. A method in accordance with claim 3, wherein said at least one vertical column comprises two vertical columns.

\* \* \* \* \*